United States Patent Office 2,790,556
Patented Apr. 30, 1957

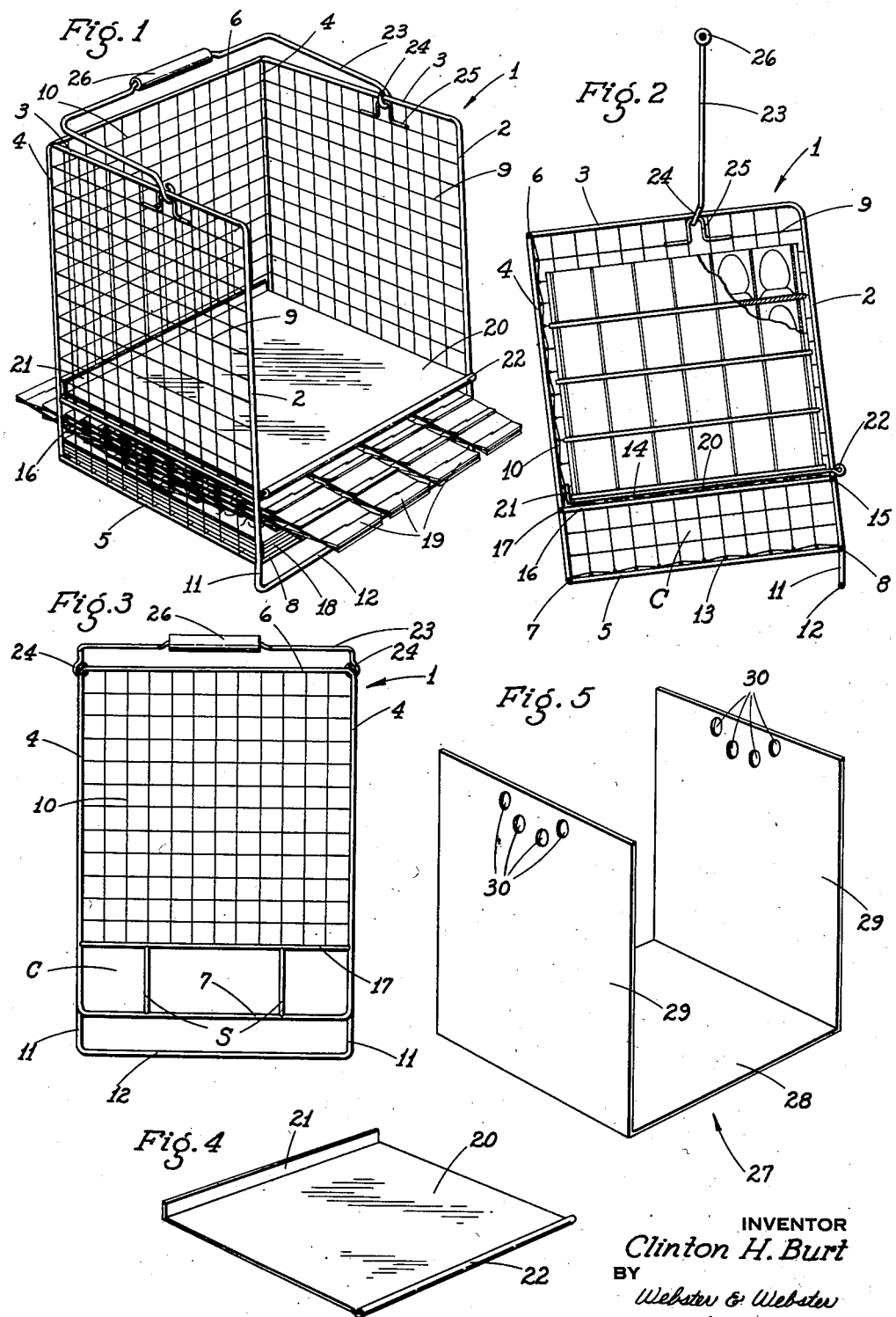
April 30, 1957  C. H. BURT  2,790,556
EGG GATHERING BASKET
Filed March 1, 1954
INVENTOR
Clinton H. Burt
BY
Webster & Webster
ATTYS

2,790,556
EGG GATHERING BASKET
Clinton H. Burt, Oroville, Calif.

Application March 1, 1954, Serial No. 413,180

1 Claim. (Cl. 211—50)

This invention is directed to, and it is a major object to provide, an improved egg gathering basket especially designed, but not limited, for use by commercial egg producers; the advantages of the device including easier gathering, ready counting, prevention of crushing or breakage, and minimization of handling.

Another object of the instant invention is to provide an egg gathering basket which is adapted to receive conventional flats and fillers in a stack and for the support of the eggs—layer upon layer and in separated relation—in the basket; a supply of the flats, together with initially folded fillers, being carried in a lower portion of the basket where they are readily manually accessible for use as needed.

An additional object of the invention is to provide an egg gathering basket which includes a box-like frame, fully open top and front, for easy placement of the flats, fillers, and eggs in the basket; the latter including a bail-type handle by means of which the basket is carried, and such handle being so related to the remainder of the basket that the latter, in suspension, tilts downwardly at the rear. The purpose of this downward tilting of the basket at the rear is to overcome any tendency of the stacked flats and fillers, and the supported eggs, from sliding forwardly and escaping from the basket.

A further object of this invention is to provide an egg gathering basket which includes means to maintain the aforesaid downward tilt of the basket at the rear, and for the same purpose, when the basket rests on the ground or on a bench.

A separate object of the invention is to provide the egg basket with means whereby the stack of flats and fillers, with the eggs supported thereby, may be readily and conveniently removed from the open front of the basket for placement of the stack in a cool-room or the like, and—if desired—for replacement of the stack in the basket subsequently for transport to a candling table, or other point.

Still another object of this invention is to provide a carrier, for selective use in the egg gathering basket, which permits the stack of flats and fillers, with the eggs supported thereby, to be lifted out of the basket at the open top thereof and then placed directly in an egg shipping case.

It is also an object of the invention to provide an egg gathering basket which is designed for ease and economy of manufacture.

Still another object of the invention is to provide a practical, reliable, and durable egg gathering basket, and one which will be exceedingly effective for the purpose for which it is designed.

These objects are accomplished by means of such structure and relative arrangement of parts as will fully appear by a perusal of the following specification and claim.

In the drawings:

Fig. 1 is a perspective view of the improved egg gathering basket, as seated on the ground, with the metallic slide in place and showing the manner in which a stack of flats and a quantity of the folded fillers are carried in the lower portion of the basket preparatory to its use.

Fig. 2 is a side elevation, in section, showing the egg gathering basket as in suspension by the handle; a stack of flats and fillers, partially broken away, being shown as used in the basket, and the supply of flats and fillers normally caried in the lower portion of the basket being omitted for clarity.

Fig. 3 is a rear elevation of the egg gathering basket.

Fig. 4 is a perspective view of the metallic slide, detached.

Fig. 5 is a perspective view of the paperboard carrier.

Referring now more particularly to the drawings, and to the characters of reference marked thereon, and especially at present to Figs. 1–4 inclusive, the improved egg gathering basket comprises an upstanding box-like frame, indicated generally at 1, which frame is of heavy-duty wire in skeleton construction, and is fully open to the top and front. This frame 1 includes front posts 2, top side bars 3, rear posts 4, bottom side bars 5, a rear top cross bar 6, a rear bottom cross bar 7, and a front bottom cross bar 8; all secured together in rigid unitary relation.

The box frame 1, including the aforesaid elements, is fitted with side panels 9 and a rear panel 10; all of said panels being of relatively heavy-duty wire mesh, with the panels soldered or welded at the edges to the related bars.

The front posts 2 project at their lower ends below the front bottom cross bar 8 a distance to form short legs 11, which are connected at their lower ends by a transverse foot bar 12. As the transverse foot bar 12 is disposed a distance below the rear bottom cross bar 7 when the basket is horizontal, the basket when set on the ground or on a bench tilts downwardly at the rear for the purpose as will hereinafter appear.

A bottom 13, likewise of wire mesh, is secured in the frame 1, being bordered by the bottom side bars 5, rear bottom cross bar 7, and front bottom cross bar 8. A distance above the bottom 13, but much less than half the height of the basket, such basket is fitted with a floor 14 likewise of wire mesh.

The floor 14 is bordered and supported by a front intermediate cross bar 15, side intermediate cross bars 16, and a rear intermediate cross bar 17; all of which intermediate bars are secured to and supported by the corresponding posts 2 or 4.

The space or compartment C defined between the bottom 13 and the floor 14 is adapted for the reception of a stack of flats 18, and on top of the latter a plurality of folded fillers 19; said flats and fillers being of the conventional type for supporting and locating eggs in separated relation.

Transversely spaced, vertical stop bars S connect between the rear bottom cross bars 7 and rear intermediate cross bar 17; the purpose of these stop bars being to prevent the flats 18 from escaping rearwardly from the compartment C. As the compartment C is open to the front and rear, except for the stop bars S at the rear, and which are spaced so as to form no obstruction, the folded fillers 19—which are longer than the front to rear dimension of the basket, can project at the ends outwardly therefrom. See Fig. 1.

When the basket is in use a rectangular metal slide 20 rests in substantially matching relation on the floor 14; said slide having a short upstanding flange 21 at the rear edge, and a rolled front edge 22; the latter forming a finger grip.

An inverted U-shaped bail-type handle 23 is connected at the free ends by eyes 24 to the side top bars 3; the eyes 24 being maintained against undesirable displacement along said bars by means of locator yokes 25 which are fixed in connection with the related side panels 9.

The eyes 24 engage about the side top bars 3 at a point closer to the front of the box frame 1 than to the rear thereof. As a result the basket, when in suspension from the handle 23, which includes a central grip 26, tilts downwardly at the rear in the manner shown in Fig. 2. In other words, when the basket is being carried by the handle 23 the metal slide 20 has a downward incline from front to rear; the purpose of which will hereinafter appear.

In use of the above described egg gathering basket, one of the flats 18 is removed from the stack in the compartment C and is placed on the metal slide 20; a folded filler 19 then being withdrawn from said compartment, unfolded to square, and placed on the flat which rests on said slide. As the eggs are gathered they are placed on the slide-supported flat 18, and in the separate pockets of the open filler 19 thereon. Thereafter, progressively the eggs are deposited in the basket, layer upon layer, in the manner shown in Fig. 2; each layer comprising one of the flats 18 and one of the fillers 19 unfolded to square.

The purpose of arranging the basket so that it tilts downwardly at the rear when in suspension, and also when seated on the ground or a bench, is to assure that the layer-upon-layer stack of flat and filler supported eggs in the basket cannot accidentally slide forwardly and escape therefrom; the tendency being for the stack to seek engagement with the rear panel 10 of the basket.

After the basket is filled with gathered eggs, the stack of flats and fillers, together with the eggs supported therein, may be withdrawn as a unit from the basket by merely removing the slide 20; the finger grip 22 permitting the slide to be readily moved, while the short upstanding flange 21 assures against relative rearward displacement of the stack on said slide. In this convenient manner the stack can be withdrawn from the basket for placement in a cool-room or the like, and subsequently—if desired—the stack on such slide can be readily replaced in the basket. This replacement of the stack in the basket may be desirable in order to permit the stack to be conveniently carried to a candling station; the eggs in the stack being removed one by one for candling, while the stack still stands in the basket.

It is understood of course that before the eggs can be individually manually picked up from each layer for candling, the related filler must be removed. This leaves the eggs in such layer free for unobstructed access, and the downward tilt of the basket at the rear, as hereinbefore described, is of advantage in that the eggs do not have a tendency to spill forwardly off the supporting flat and out of the open front of the basket. With the basket thus used to support a stack of eggs for candling, much handling of such eggs is eliminated, and the individual ones thereof can be picked up quicker and with greater safety than when they are contained—for example—in a round basket at the candling station.

Under some circumstances it may be desirable to load the eggs directly from the described egg gathering basket into an egg case, and for this purpose the slide 20 is omitted, and instead a U-shaped paperboard carrier, indicated generally at 27, and as shown in Fig. 5, is placed on the basket in lieu of said slide. The paperboard carrier 27 includes a bottom 28, and upstanding side panels 29 having finger-holes 30 in the upper portions thereof.

The paperboard carrier 27 is placed in the basket with the bottom 28 resting on the floor 14, and with the side panels 29 abutting the side panels 9. With the carrier 27 so disposed the egg carrying basket is used as before; a stack of flats 18 and fillers 19 being made up, progressively, from the bottom 28 upwardly, with the eggs supported on the flats within the separate pockets of the fillers. When the stack is complete the carrier 27, with the stack therein, is merely lifted from the basket and placed in the egg case; the finger-holes 30 facilitating this operation.

While the egg gathering basket is heretofore described as used with separate conventional flats and fillers, such basket may be used with equal ease and convenience with so-called filler-flats.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claim.

Having thus described the invention, the following is claimed as new and useful, and upon which Letters Patent are desired:

An egg gathering basket for use in connection with an initially folded egg carrying and spacing filler and a flat substantially the size of the horizontal area of the basket, said basket comprising a box-like rectangular frame open at the top and front and of a horizontal area sufficient to receive an unfolded filler in fitting relation and of a height sufficient to support a predetermined number of such fillers, the basket including a bottom, a floor mounted a predetermined distance above the bottom and arranged to provide a chamber to receive a supply of folded fillers and flats; the back of the basket being mainly open between the bottom and the floor and unobstructed whereby such folded fillers may project therepast, and a vertical stop between the floor and the bottom at the back of the frame and spaced from the sides of the basket a distance greater than the width of a folded filler when the latter is laid flat on said bottom.

References Cited in the file of this patent

UNITED STATES PATENTS

| | | |
|---|---|---|
| 860,496 | Reed | July 16, 1907 |
| 971,060 | Lynch | Sept. 27, 1910 |
| 1,009,451 | Subert | Nov. 21, 1911 |
| 1,142,932 | Clark | June 15, 1915 |
| 1,310,725 | Westergard | July 22, 1919 |
| 1,443,615 | Bowen | Jan. 30, 1923 |
| 1,915,620 | Rowland | June 27, 1933 |
| 2,235,709 | Hearn et al. | Mar. 18, 1941 |
| 2,315,094 | Rehfield et al. | Mar. 30, 1943 |
| 2,404,065 | Hill | July 16, 1946 |
| 2,503,833 | Miller | Apr. 11, 1950 |
| 2,527,432 | Landon | Oct. 24, 1950 |
| 2,642,876 | D'Heilly | June 23, 1953 |
| 2,684,766 | Blom | July 27, 1954 |

FOREIGN PATENTS

| | | |
|---|---|---|
| 343,307 | Great Britain | Feb. 19, 1931 |
| 54,155 | Norway | July 16, 1934 |